United States Patent
Shitomi et al.

(10) Patent No.: US 7,249,119 B2
(45) Date of Patent: Jul. 24, 2007

(54) SYSTEM FOR MANAGING ACCESS AND STORAGE OF WORM FILES WITHOUT SENDING PARAMETERS FOR ASSOCIATED FILE ACCESS

(75) Inventors: Hidehisa Shitomi, Mountain View, CA (US); Takahiro Nakano, Yokohama (JP); Yoji Nakatani, Yamato (JP); Mitsuru Ikezawa, Sagamihara (JP); Yohsuke Ishii, Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/880,506

(22) Filed: Jul. 1, 2004

(65) Prior Publication Data
US 2005/0240636 A1 Oct. 27, 2005

(30) Foreign Application Priority Data
Apr. 22, 2004 (JP) ............................. 2004-127113

(51) Int. Cl.
*G06F 7/00* (2006.01)
(52) U.S. Cl. ........................... 707/1; 707/10; 707/204; 709/229
(58) Field of Classification Search .................... 707/1, 707/10, 204; 709/229
See application file for complete search history.

(56) References Cited

U.S. PATENT DOCUMENTS

| | | | | |
|---|---|---|---|---|
| 5,029,125 A | * | 7/1991 | Sciupac | ...................... 707/205 |
| 5,495,607 A | | 2/1996 | Pisello et al. | |
| 5,530,899 A | | 6/1996 | MacDonald | |
| 5,535,375 A | * | 7/1996 | Eshel et al. | ..................... 703/27 |
| 5,634,122 A | * | 5/1997 | Loucks et al. | ................. 707/8 |
| 5,678,042 A | | 10/1997 | Pisello et al. | |
| 5,832,563 A | * | 11/1998 | Simpson | ..................... 16/110.1 |
| 5,956,733 A | | 9/1999 | Nakano et al. | |
| 6,453,325 B1 | | 9/2002 | Cabrera et al. | |
| 6,611,850 B1 | * | 8/2003 | Shen | ........................... 707/204 |
| 6,678,700 B1 | | 1/2004 | Moore et al. | |
| 2002/0015249 A1 | * | 2/2002 | Takayama et al. | ............. 360/48 |

(Continued)

OTHER PUBLICATIONS

Network Appliance—Near Store, "Cost-effective, fast-access storage for backup and recovery, reference data, online archival, and remote diaster recovery", [online], Internet, <URL:http://www.netapp.com/products/nearstore/>, no exact date 2004 copyright.

(Continued)

*Primary Examiner*—Dong Wong
*Assistant Examiner*—Michael Le
(74) *Attorney, Agent, or Firm*—Antonelli, Terry, Stout & Kraus, LLP.

(57) ABSTRACT

To provide a storage system and a file management device which enable obtaining a file, without designating detailed information. A client is provided with a read request module that sends a file read request containing information corresponding to a file name and an archived date of the file. A WORM archive server is provided with a file identifying module that extracts information corresponding to the file archived date and the file name from the file read request that was received from the client, and identifies the latest archived file with the file name registered before the archived date corresponding to the extracted information from among files recorded in a storage device, and a file sending module that sends the identified data to the client that sent the request.

7 Claims, 12 Drawing Sheets

U.S. PATENT DOCUMENTS

2002/0065999 A1* 5/2002 Kikuchi et al. ............. 711/162
2004/0181605 A1* 9/2004 Nakatani et al. ............ 709/233
2005/0097260 A1* 5/2005 McGovern et al. ......... 711/100
2005/0175259 A1* 8/2005 Takenouchi ................. 382/305

OTHER PUBLICATIONS

EMC Corporation, EMC Centera, "Centera Content Addressed Storage Product Description Guide", URL://www.emc.com/pdf/products/centera/centera_guide.pdf, no exact date 2003 copyright.

* cited by examiner

| FID | CLIENT PATH NAME | STORAGE PATH NAME | ARCHIVED DATE |
|---|---|---|---|
| 001 | /aa/a | /S1/1 | 09/10/00 |
| 002 | /aa/a | /S1/2 | 10/10/00 |
| 003 | /test | /S1/3 | 11/25/00 |
| 004 | /bb/b | /S1/4 | 11/25/00 |
| 005 | /cc/c | /S1/5 | 12/01/00 |
| 006 | /bb/b | /S1/6 | 12/10/00 |
| 007 | /cc/c | /S1/7 | 12/20/00 |

FILE INFORMATION TABLE

ARCHIVED DATE MANAGEMENT TABLE FOR PROCESSES

ARCHIVED DATE MANAGEMENT TABLE FOR CONNECTIONS

| FID | CLIENT PATH NAME | STORAGE PATH NAME | ARCHIVED DATE | STATUS |
|---|---|---|---|---|
| 001 | /aa/a | /S1/1 | 09/10/00 | DELETED, 01/23/04, DELETED BY: abc |
| 002 | /aa/a | /S1/2 | 10/10/00 | MIGRATED, MIGRATED TO: 127.0.0.2 |
| 003 | /test | /S1/3 | 11/25/00 | |
| 004 | /bb/b | /S1/4 | 11/25/00 | |
| 005 | /cc/c | /S1/5 | 12/01/00 | |
| 006 | /bb/b | /S1/6 | 12/10/00 | |
| 007 | /cc/c | /S1/7 | 12/20/00 | |

FILE INFORMATION TABLE

SYSTEM FOR MANAGING ACCESS AND STORAGE OF WORM FILES WITHOUT SENDING PARAMETERS FOR ASSOCIATED FILE ACCESS

CLAIM OF PRIORITY

The present application claims priority from Japanese application P2004-127113 filed on Apr. 22, 2004, the content of which is hereby incorporated by reference into this application.

BACKGROUND

The present invention relates to a storage system for storing a file to be accessed from a client, and more particularly to a storage system and a file management device enabling obtaining of a file from a client without designating detailed information.

When holding electronic data in a storage or the like, there are problems relating to the retention period of the electronic data. As the amount of data increases, the demanded capacity of the storage also increases, requiring higher costs. Therefore, important data is recorded in a high-speed storage with a wide bandwidth, and unimportant data is recorded in a relatively low-speed storage. Such a high-speed storage with the wide bandwidth is expensive, and such a relatively low-speed storage is inexpensive. Further, based on the date when the data is saved (i.e., the archived date), fresh data (data for which not much time has elapsed since being archived) is recorded in the high-speed storage, and less fresh data (data for which a predetermined period has elapsed since being archived) is recorded in the low-speed storage. This type of data management method is called Data Lifecycle Management (DLCM).

As a scheme for saving files with long-term saving of files in Data Lifecycle Management (DLCM) taken into consideration, there is known a WORM (Write Once Read Many) archive that manages modification and deletion of files within the retention period.

For example, there is known a WORM archive, in which a WORM file stored by a WORM archive server is managed by means of a unique identifier, and for each file, an identifier, a file location in the storage, and a file attribute are recorded (refer to EMC Corporation, "EMC Centera"), Alternatively, there is known a WORM archive, in which a file inside a WORM archive server is managed by the same path name as a path name on a client (e.g., see Network Appliance, "NetApp NearStore").

The client that reads out the WORM file designates, via a WORM archive client library, either the identifier or a set of the file name and the archived date, whereby the WORM file can be read out.

Furthermore, in the "EMC Centera", when re-archiving a WORM file that was read out and then modified by the client, the WORM file is archived as a WORM file having a different identifier.

SUMMARY

In order to access (e.g., read) the WORM file from the client, it is necessary to designate, every time, either the identifier, or the set of the path name and the specific archived date. However, when an application using the WORM file that was read, tries to read a file that is relevant to the file, the application can know the file name (including path name) of the relevant file. However, the archived date and identifier usually cannot be known since they are managed on the WORM archive server side. Therefore, unless such information can be accessed from the WORM archive server by the user, or unless the client's application is modified or the like, the relevant file cannot be read.

For example, a WORM file A that the client read from the WORM archive server is considered. The WORM file A has a file with a link. When referencing a file B at the link destination, the client cannot learn the archived date or identifier of the file B. Therefore, the client cannot read and restore the file B from the point in time when the file A was archived.

An object of the present invention is to provide an archive server and storage system enabling access to a WORM file from a client side, without designating necessary information (an identifier, an archived date, etc.).

In embodiments of the present invention, when a file is read, an archived date of that file is stored per processing unit (per client process, per server connection, etc.). After that, each time another file associated with that file is to be read, only the file name is first designated, and then the archived date stored per processing unit is appended to the file name and a request is made to read the file.

According to one embodiment, a client sends a file read request containing information corresponding to a file name and an archived date of the file. A WORM archive server extracts information corresponding to the file archived date and the file name from the file read request that was received from the client, and identifies the latest archived file with the file name registered before the archived date corresponding to the extracted information from among files recorded in a storage device. A WORM archive server sends the identified data to the client that sent the request According to another embodiment, a client sends a file read request containing a file name. A WORM archive server obtains the file name contained in the file read request and the identifier associated with the file read request, obtains the archived date corresponding to the obtained identifier from the archived date recording module, appends the archived date to the file read request, and identifies a latest archived file with the file name recorded before the obtained archived date from among files recorded in the storage device. A WORM archive server sends the identified file to the client that sent the request.

According to the embodiment, by reading out a single given file, another file associated with the given file can be read without designating the archived date of the associated file.

DETAILED DESCRIPTION OF THE PREFERRED EMBODIMENTS

First Embodiment

Figure 1:
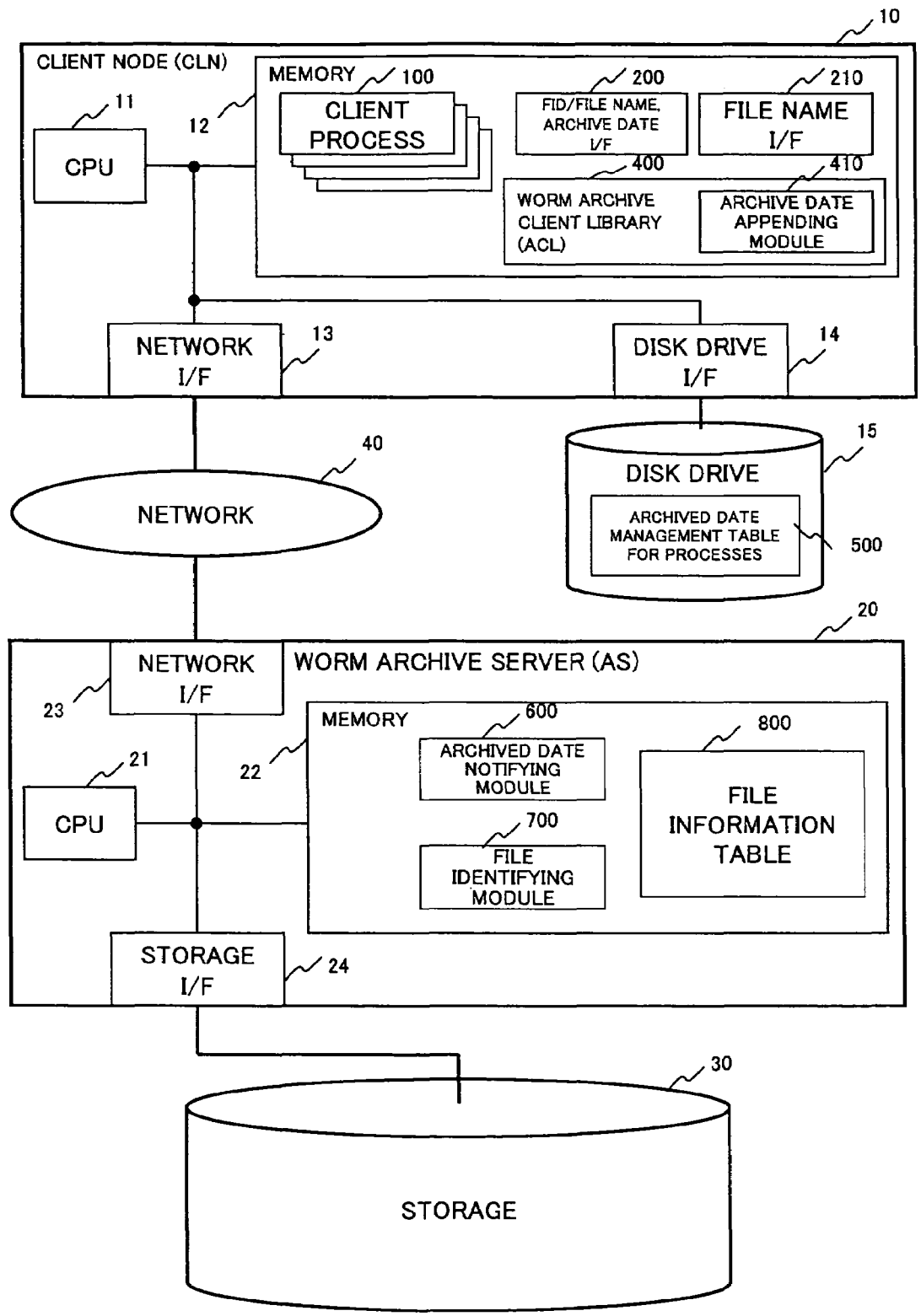
FIG. 1 is a block diagram of a detailed construction of a storage system according to a first embodiment.

FIG. 1 is a block diagram of a construction of a storage system according to a first embodiment of the present invention.

The storage system according to the first embodiment is constituted by a client node 10, a WORM archive server 20, a storage 30, and a network 40 connecting the client node 10 and the WORM archive server 20.

The client node 10 is a computer that requests the WORM archive server 20 to write (archive) or read the data (WORM file), and is connected to the WORM archive server 20 via the network 40. The client node 10 is constituted by a CPU 11, a memory 12, a network interface 13, a disk drive interface 14, and the like.

The memory 12 stores a client process 100, a file ID (FID)/file name and archived date interface 200, a file name interface 210, a WORM archive client library 400, and an archived date appending module 410. These are software installed on the memory, and are executed by the CPU 11.

The client process 100 makes a request to the WORM archive server 20 for access to the WORM file. Plural client processes 100 are operating on the client node 10.

The FID/file name and archived date interface 200 designates at least one of a file ID and a set of a file name and an archived date, and request to read the WORM file. The file name interface 210 designates only the file name and requests to read the WORM file.

The WORM archive client library 400 sends the request to the WORM archive server 20. The archived date appending module 410 is included in the WORM archive client library 400, and when the WORM file read request designating only the file name is received from the file name interface 210, adds the archived date (information indicating at least one of the archived date and archived time) that corresponds to the file name.

The network interface 13 operates as an interface to the network 40. That is, the network interface 13 functions as a sending unit to send data through the network 40 to the WORM archive server 20, and also functions as a receiving unit to receive data sent from the WORM archive server 20.

The disk drive interface 14 operates as an interface (e.g., SCSI: Small Computer System Interface, FC: Fibre Channel, iSCSI: internet SCSI, etc.) to a disk drive 15.

Further, the disk drive 15 which is connected to the client node 10 holds an archived date management table for processes 500, in which there are correspondences between process IDs of each process, and archive date information (archive information).

It should be noted that the archived date management table for processes 500 may be held in the disk drive 15 connected to the client node 10 as shown in FIG. 1, or may be held in the memory 12 of the client node 10.

The WORM archive server 20 is a file management device that manages the WORM files recorded in the storage 30.

The WORM archive server 20 is connected to the client node 10 via the network 40, receives the request from the client node 10, and reads the requested file from the storage 30 and returns this file to the source of the request.

The WORM archive server 20 is constructed from a CPU 21, a memory 22, a network interface 23, a storage interface 24, and the like.

The memory 22 includes an archived date notifying module 600, a file identifying module 700, and a file information table 800. These are software installed on the memory as software, and are executed by the CPU 21.

The archived date notifying module 600 obtains the archived date information of the file archived by the client node 10, and records this in the file information table. Further, when the client reads the file, the archived date information of that file is obtained from the file information table.

The file identifying module 700 searches the file information table using the set of the file name and the archived date information of the file. The file identifying module 700 obtains the file location in the storage 30. The network interface 23, similarly to the network interface 13 that is provided to the client node 10, operates as an interface to the network 40. That is, the network interface 23 functions as a sending unit to send data through the network 40 to the client node 10, and also functions as a receiving unit to receive data sent from the client node 10.

The storage interface 24 operates as an interface to the storage 30.

The storage 30 is connected to the WORM archive server 20 such that it can communicate using a protocol appropriate for data transfer (e.g., SCSI: Small Computer System Interface, FC: Fibre Channel, iSCSI: internet SCSI, NFS: Network File System, CIFS: Common Internet File System, etc.), and saves WORM files. One or more storages 30 are connected to the WORM archive server 20. The storage 30 and the WORM archive server 20 may be connected directly, or may be connected by means of a network.

Figure 2:
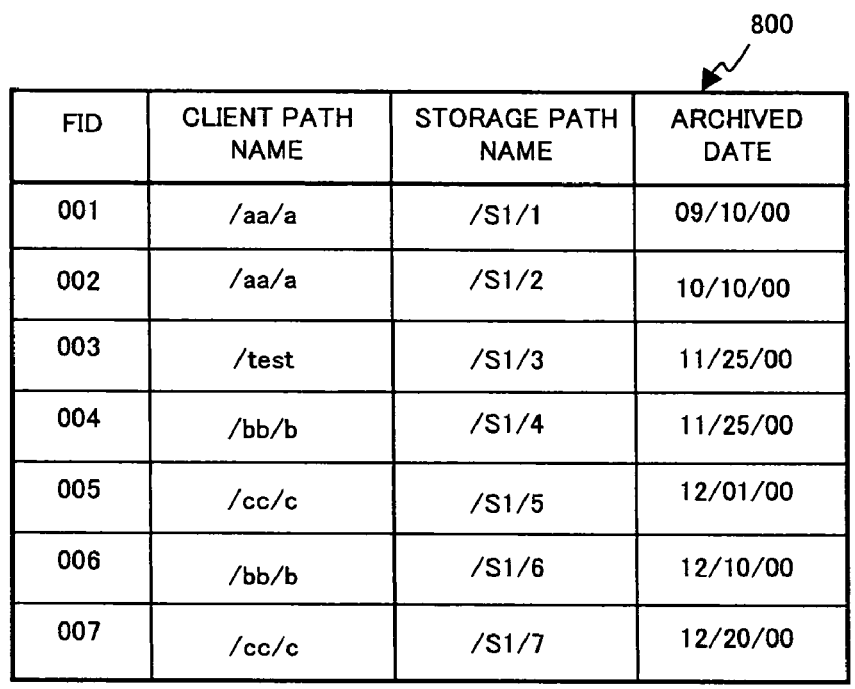
FIG. 2 is a file archived date management table according to the first embodiment.

FIG. 2 is an explanatory diagram of the file information table 800 provided to the WORM archive server 20.

The file information table 800 records information for identifying the WORM files stored in the storage 30 as a list.

The file ID (FID) is an identifier assigned uniquely to each WORM file by the WORM archive server 20. The client path name is a path name and a file name managed on the client node 10 side. The storage path name is a path name and a file name of the WORM file actually stored in the storage 30. For example, the client node 10 manages a file with a file ID of "001" as a file "a" located at a path. "/aa/". In the storage 30, this file "a" is saved at a path "/S1/" as a file "1". The archived date shows the date and time when the file was saved in the storage 30.

The WORM file sometimes modifies the file that was read by the client node 10, and re-archives the file under the same file name. As a result, there are instances where there are plural identical file names archived at different dates. When the client node 10 reads the WORM file, a method of designating the file ID to read the file, or a method of designating the file name (client path name) and the archived date to read the file, is used. Since the file ID is set to be unique with respect to each file, the file can be read by designating the file ID. However, when the file is read by designating the file name, there are plural files with different archived dates and the same file name, so it is necessary to identify the archived date in order to read the file.

Figure 3:
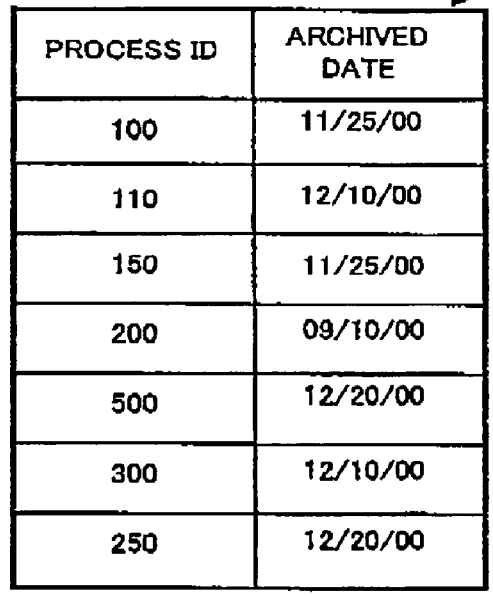
FIG. 3 is a file archived date management table for processes according to the first embodiment.

FIG. 3 is an explanatory diagram of the archived date management table for processes 500, which is recorded in the disk drive 15 connected to the client node 10.

The process ID is an identifier assigned uniquely to each client process 100. The archived date 502 is the archived date and time obtained from the WORM file that was read by the client process 100.

As described below, when the client process 100 requests the WORM archive server 20 to read out the WORM file, the archived date management table for processes 500 records the archived date and time of that WORM file by using the WORM archive client library 400. Then, when reading a WORM file that is linked to that WORM file, the archived date appending module 410 obtains the archived date recorded in the archived date management table for processes 500, and makes a file read request to the WORM archive server 20.

Next, explanation is given regarding operations of the storage system according to the first embodiment of the present invention.

Figure 4:
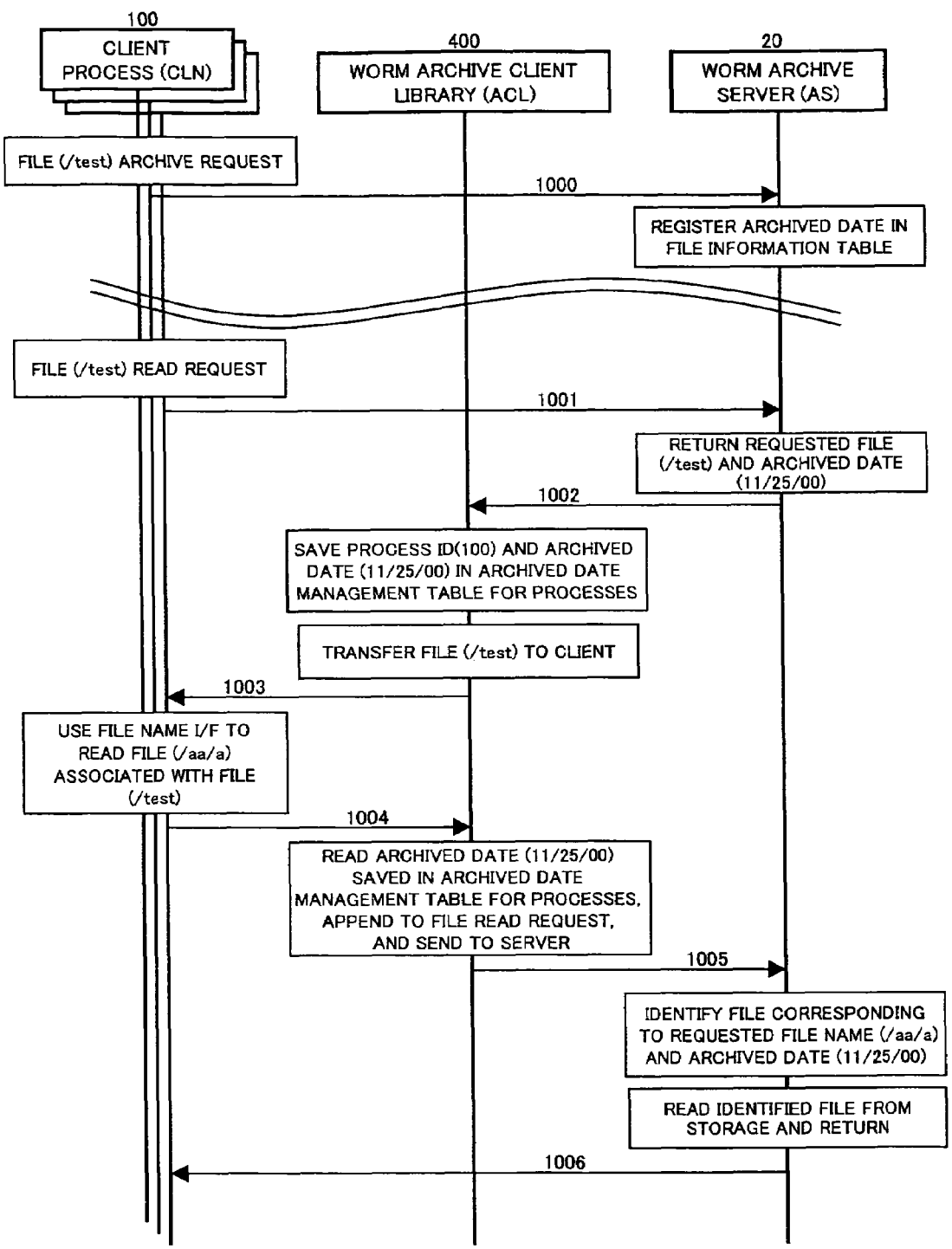
FIG. 4 is a sequence diagram of processing in a storage system according to the first embodiment.

FIG. 4 is a sequence diagram of processing executed by the storage system according to the first embodiment of the present invention.

First, explanation is given regarding processing to archive the WORM file into the WORM archive server 20.

First, the client process 100 sends to the WORM archive server 20 an archive request to save the file (the file name is "/test") (step 1000). The WORM archive server 20, when the archive request is received, writes the file into the storage 30. At this time, the file's file ID, client path name (/test), storage path name and archived date are registered in the file information table 800 (FIG. 2).

Next, explanation is given regarding processing in which the client process 100 reads the WORM file (/test) that is saved in the storage 30.

The client process 100, using the file ID/file name and archived date interface 200, sends the read request to read the WORM file (/test) that is saved in the storage 30 to the WORM archive server 20 (step 1001). The WORM archive server 20, when the request is received, obtains the storage path name, referring to the file information table 800. The WORM archive server 20 identifies the file location in the storage 30, and obtains the file ("/test") from the storage 30. Then, the obtained file ("/test") and the information showing the file's archived date are sent to the client process 100 (step 1002).

The file and archived date information, which were sent to the client node 10, are first received by the WORM archive client library 400. The WORM archive client library 400 first records the received archived date information and the process ID of the client process 100 that requested to read the file, into the archived date management table for processes 500 (FIG. 3). Then, the received file ("/test") is transferred to the client process 100 that requested to read the file (step 1003).

Through this series of processing, the client process 100 can obtain the requested WORM file.

Here, explanation is given regarding a case where them is a file associated with the file ("/test") that was obtained by the client process 100, and the associated file must be read. Here, the "associated file" refers to a second file to which a link is set from a first file, and when the first file is used, the data recorded in the second file becomes necessary. Specifically, examples include HTML and XML hyperlinks, WORD and EXCEL (trademark, Microsoft Corp.) spreadsheet data, and other applications' OLE object data links, Makefile source links, and the like.

The client process 100 sends a read request for the file (here, "/aa/a") which is associated with "/test" (step 1004). At this time, the client process 100 knows only the file name of the associated file, and does not know the archived date. Thus, the request sent by the client process 100 is sent using the file name interface 210.

The file read request is first received by the WORM archive client library 400.

The WORM archive client library 400 extracts, from the file read request, the process ID of the client process 100 that sent the file read request. Then, the archived date management table for processes 500 is referenced to obtain the archived date corresponding to that process ID. Then, the obtained archived date is appended to the file read request sent by the client process 100, and these are sent to the WORM archive server 20 (step 1005).

The WORM archive server 20 receives the request and sends the request to the file identifying module 700. The file identifying module 700 then executes processing (file identifying processing) to identify the file managed by the WORM archive server 20, based on the archived date and the file (/aa/a) for which the read request was received.

The WORM archive server 20 references the file information table 800 to obtain the storage path name. The WORM archive server 20 identifies the file location in the storage 30, and obtains from the storage 30 the file (/aa/a) that was identified by the file identifying processing. Then, the obtained file (/aa/a) is sent to the client process 100 (step 1006).

As a result of these processes, when reading the WORM file, the client process 100 can obtain the file by designating only the file name, without designating information for identifying the file (such as the file ID and archived date).

It should be noted that as described above, plural client processes 100 are executed on the client node 10, so the client process 100 that saves the file and the client process 100 that reads the file are not necessarily the same.

Figure 5:
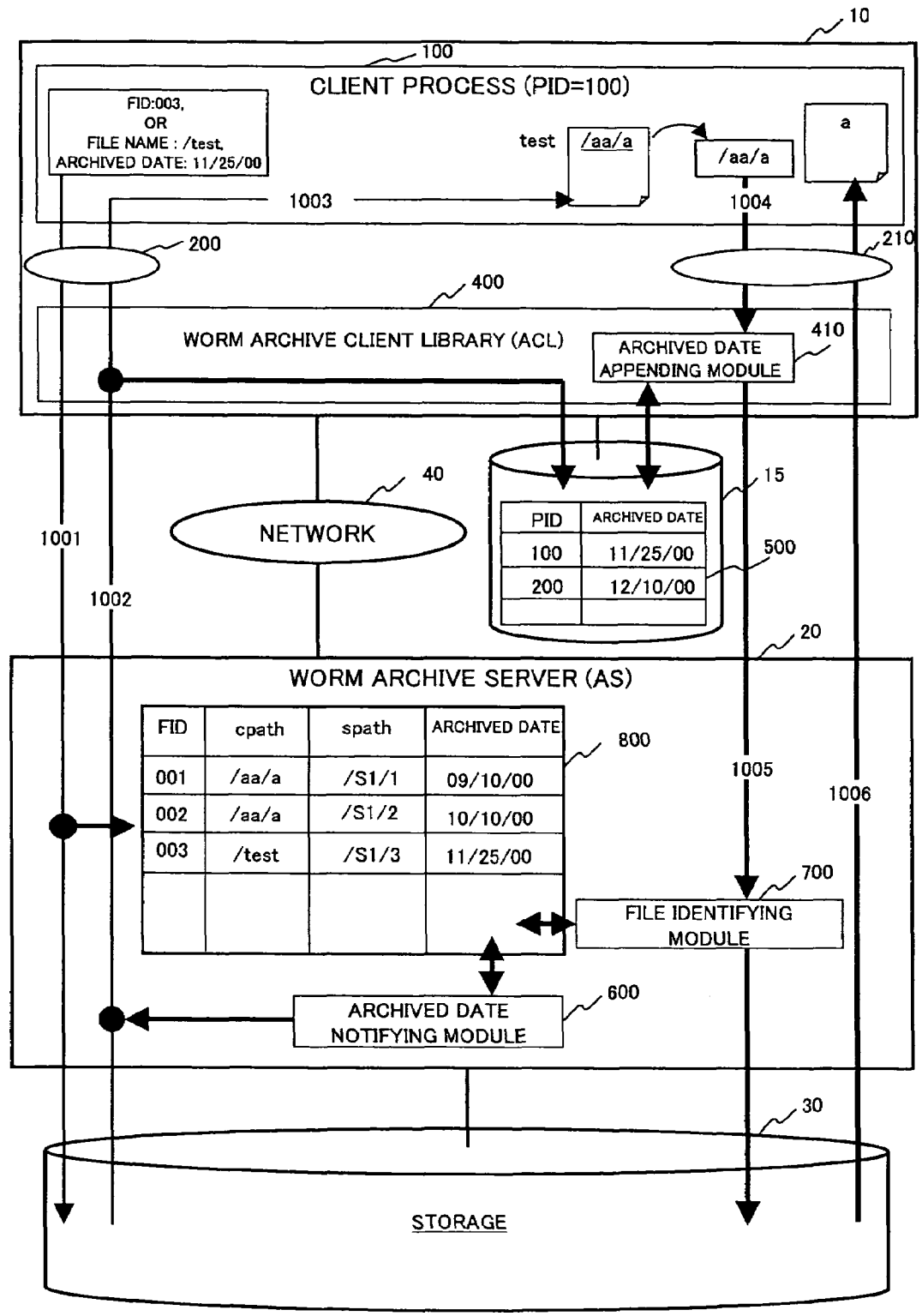
FIG. 5 is an explanatory diagram of processing in the storage system according to the first embodiment.

FIG. 5 is an explanatory diagram adapted the processing in FIG. 4 to a system configuration diagram.

As described above, the client process 100 registers the file ("/test") into the WORM archive server 20 beforehand.

When the client process 100 (process ID is "100") requests to read the WORM file ("/test"), the client process 100 either designates the file ID (003) of the WORM file, or designates both the file name (/test) and the archived date (Nov. 25, 2000). The client process 100, using the file ID/file name and archived date interface 200, requests the WORM archive server 20 to read the file (step 1001).

The WORM archive server 20, when the file read request is received, identifies the WORM file that is saved in the storage 30 based on the file ID or file name and the archived date of the file of the read request, referring to the file information table 800. Then the WORM archive server 20 reads the WORM file from the storage 30. The WORM file that is read out is sent to the client process 100 (step 1002).

At this time, the archived date notifying module 600 of the WORM archive server 20 obtains the information indicating the archived date of the file from the file information table 8, and sends this together with the file to the client process 100 (step 1002).

The file and archived date information sent to the client node 10 is first received by the WORM archive client library 400. The WORM archive client library 400 first saves the received archived date information (Nov. 25, 2000) and the process ID (100) of the client process 100 that requested to read the file, into the archived date management table for processes 500. Then, the received file (/test) is transferred to the client process 100 that requested to read the file (step 1003).

Here, when reading the file (/aa/a) associated with to the file (/test) obtained by the client process 100, first the file read request designating only the file name (/aa/a) is sent (step 1004). This request is sent using the file name interface 210.

This file read request is first received by the WORM archive client library 400.

The archived date appending module 410 obtains the process ID of the client process 100 that sent the file obtaining request. Then, the archived date management table for processes 500 is referenced to obtain the archived date ("Nov. 25, 2000") corresponding to the process ID ("100"). Then, the obtained archived date is appended to the file read request sent from the client process 100, and these are sent to the WORM archive server 20 (step 1005).

The WORM archive server 20 receives the request and sends the request to the file identifying module 700. The file identifying module 700 identifies the file managed by the WORM archive server 20 based on the file (/aa/a) of the read request and the archived date (Nov. 25, 2000). Then, the WORM archive server 20 references the file information table 800 to obtain the storage path name. The WORM archive server 20 obtains from the storage 30 the file (/aa/a archived on Oct. 10, 2000 having FID 002) identified by the file identifying processing. Then, the obtained file (/aa/a) is sent to the client process 100 (step 1006).

Figure 6:
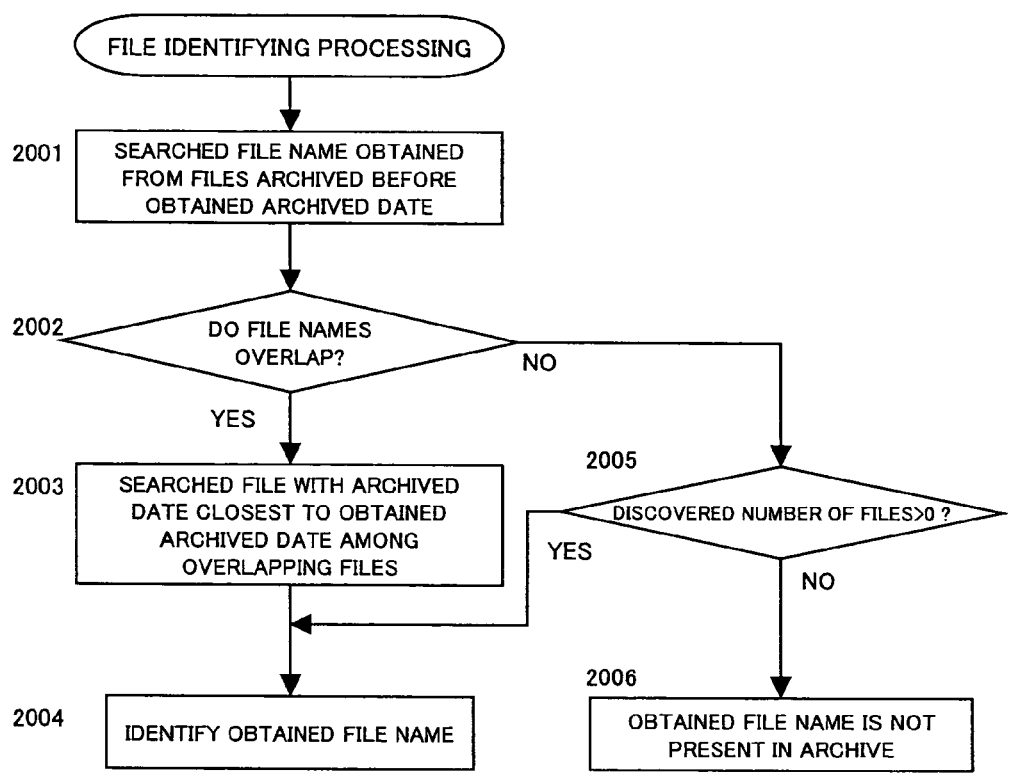
FIG. 6 is a flowchart of archive identifying processing according to the first embodiment.

FIG. 6 is a flowchart of the above-mentioned file identifying processing.

First, the file name and archived date contained in the received read request are extracted. The extracted file name is searched from the files archived on dates before the extracted archived date (step 2001).

Next, it is determined whether overlapping file names were searched (step 2002). When overlapping file names are searched, plural files have been recorded with the same file name so that the processing advances to step 2003. On the other hand, when overlapping file names are not searched, zero or only one file with the same file name has been recorded so that the processing goes to step 2005.

At step 2003, the file with the archived date closest to the archived date extracted from the read request is searched from the overlapping files. Then, the searched file is returned to the WORM archive server 20 (step 2004).

On the other hand, when it is determined that there is no overlap among the files, the processing determines whether or not the number of searched files is greater than zero (step 2005). When the number of searched files is greater than zero (i.e., one file), the file is returned to the WORM archive server 20.

On the other hand, when zero or fewer file names were searched (i.e., no files were searched), this means that the requested file is not present in the storage 30 managed by the WORM archive server 20, and this result is returned to the WORM archive server 20 (step 2006).

In the storage system according to the first embodiment of the present invention, when the client process 100 reads the WORM file, the WORM archive client library 400 obtains the archived date of the WORM file and records this in the archived date management table for processes 500. Then, when the client process 100 reads the file that is associated with the WORM file, the archived date appending module 410 included in the WORM archive client library 400 references the archived date management table for processes 500. The archived date appending module 410 appends the archived date of that WORM file to the read request for the file associated with the WORM file. And the archived date appending module 410 sends the read request to the WORM archive server 20. The file identifying module 700 in the WORM archive server 20 identifies the file requested by the client process 100, based on the file name and archived date included in the received read request. Then, the identified file is read from the storage 30 and sent to the client process 100.

According to the above, the client process 100 can read the file with the unknown archived date that is associated with the WORM file from the WORM archive server by designating only the file name. For example, when a Makefile (WORM file) is obtained, the above-mentioned method can be used to read a file treated by a compiler at the time when a Makefile was saved. The client process 100 can use the file that was read out to generate a binary file similar to the binary file obtained by executing a "make" function when the file was saved. Further, after obtaining an HTML or XML file (WORM file), the above-mentioned method can be used to read a file that was hyperlinked at the time when the HTML or XML file was saved. The client process 100 can use the file that was read out to obtain a file that was hyperlinked at the time when the file was saved.

Second Embodiment

A second embodiment is different from the first embodiment in that the file information table that manages the file's archived date is managed per connection from the client node 10 to the WORM archive server 20. It should be noted that constructions functioning identically to those in the first embodiment have the same reference numerals, and explanations thereof are omitted.

Figure 7:
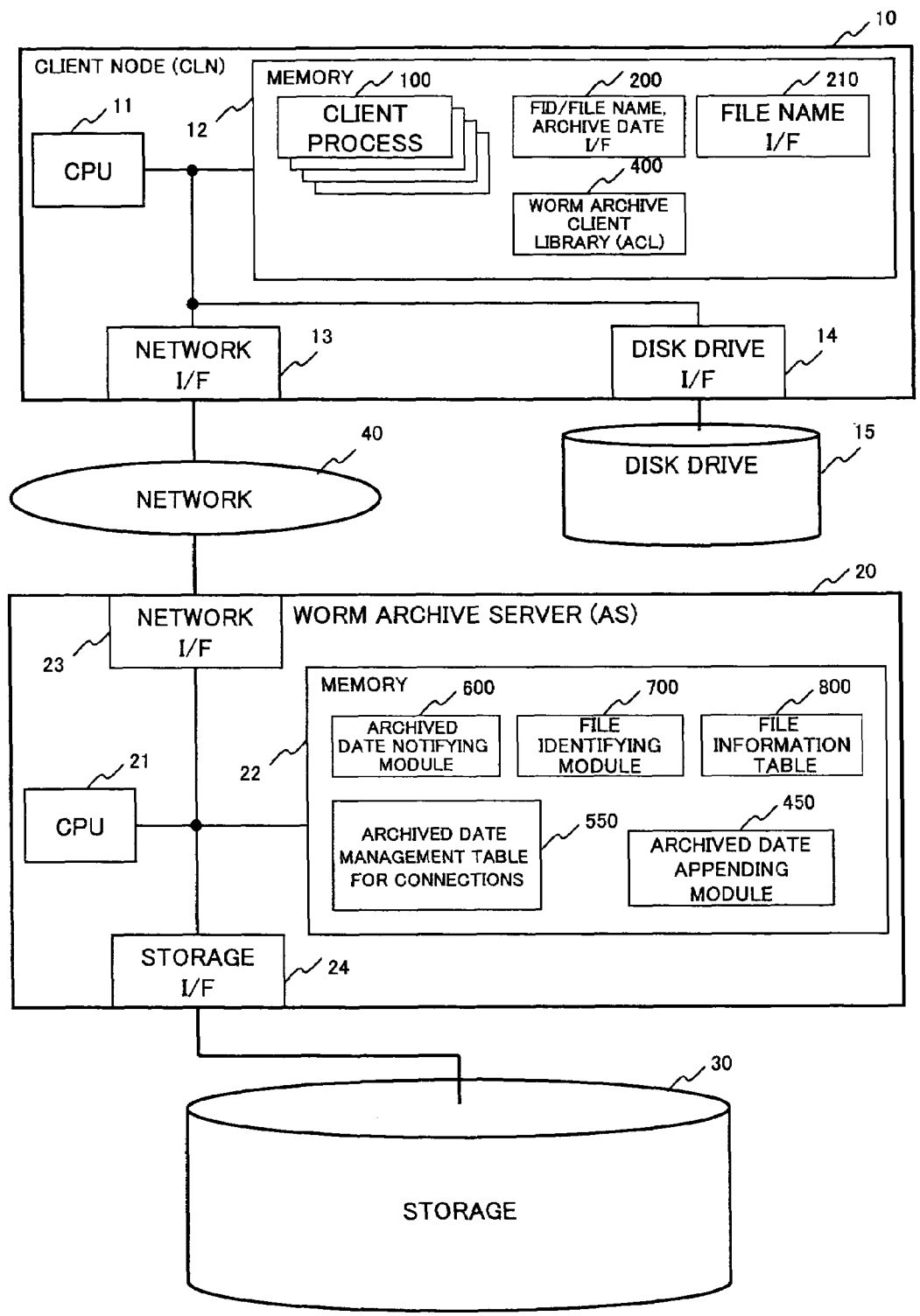
FIG. 7 is a block diagram of a storage system according to a second embodiment.

FIG. 7 is a block diagram of a storage system according to the second embodiment.

In the second embodiment, the WORM archive client library 400 is not provided with the function and archived date appending module 410 which record the archived dates of the received WORM files together with the process ID into the archived date management table for processes. Further, the disk drive 15 is not provided with the archived date management table for processes 500.

The memory 22 of the WORM archive server 20 is provided with an archived date management table for connections 550 which obtains the archived date of files per connection established by the client process 100, and saves correspondences between IDs assigned per connection (connection IDs) and archived dates. It should be noted that the archived date management table for connections 550 may also be on another disk drive connected to the storage 30 or to the WORM archive server 20.

The memory 22 in the WORM archive server 20 also contains an archived date appending module 450. This archived date appending module 450, in the case where the file read request from the client process 100 only designates the file name, references the archived date management table for connections 550, and based on the connection ID of the request, appends information indicating the archived date to the file request, and transfers these to the file identifying module 700. The file identifying module 700 sends the identified WORM file to the client process 100, similarly to the first embodiment.

Figure 8:
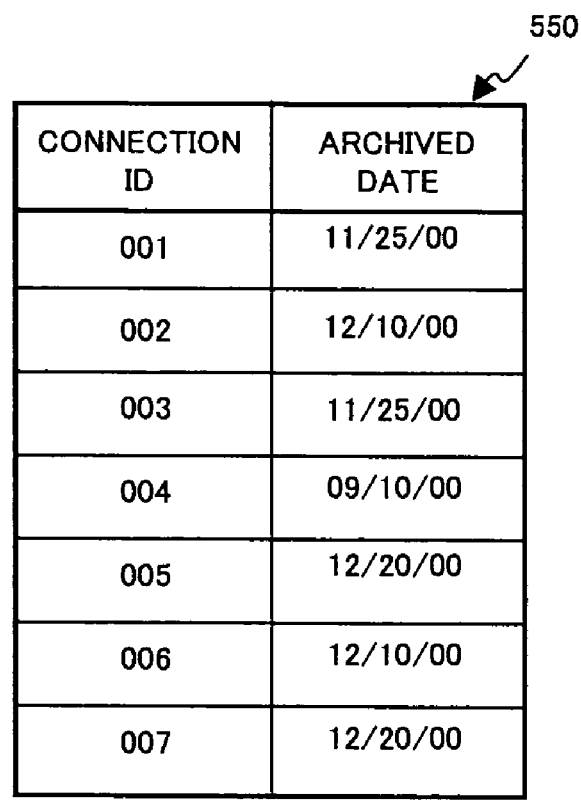
FIG. 8 is a file archived date management table for connections according to the second embodiment.

FIG. 8 is the archived date management table for connections 550 which is held in the WORM archive server 20.

The connection, which is set by the file read request from the client process 100, is assigned an ID (the connection ID) for each connection. The WORM archive server associates the connection ID with the archived date of the file requested in that the connection. And the WORM archive server saves these as the archived date management table for connections 550.

Figure 9:
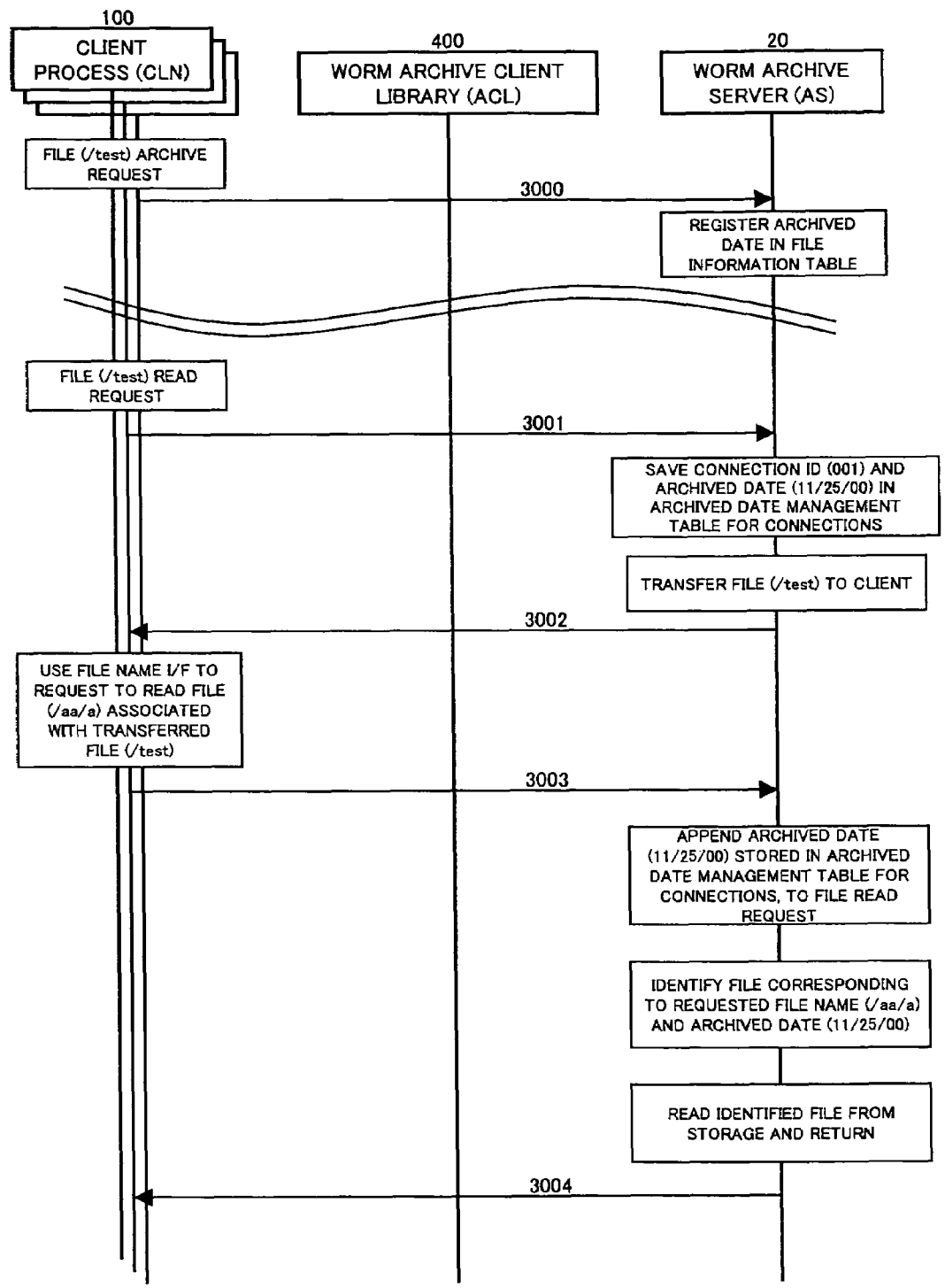
FIG. 9 is a sequence diagram of processing in the storage system according to the second embodiment.

FIG. 9 is a sequence diagram of processing of the storage system according to the second embodiment.

First, explanation is given regarding processing to save the WORM file into the WORM archive server 20.

First, the client process 100 sends to the WORM archive server 20 an archive request to save the file ("/test") (step 3000). By sending this request, the connection from the client 10 to the WORM archive server 20 is established. The WORM archive server 20 receives the archive request and writes the file into the storage 30. At this time, the file's file ID, client path name ("/test"), storage path name, and archived date are registered into the file information table 800 (see FIG. 2).

Next, explanation is given regarding processing that causes the client process 100 to read the WORM file ("/test") being saved in the storage 30.

The client process 100 uses the file ID/file name and archived date interface 200 to send to the WORM archive server 20 the read request for the WORM file (/test) saved in the storage 30 (step 3001). A unique identifier (connection ID) is given to this connection.

The WORM archive server 20, when the request is received, first obtains the connection ID of the read request and the archived date of the WORM file for which the read request was made. And then the WORM archive server 20 associates these and registers them in the archived date management table for connections 550. That is, an archived date storage unit is constituted by the WORM archive server 20 recording the connection ID and the archived date into the archived date management table for connections 550.

Next, the file information table 800 is referenced to obtain the storage path name. And the file location in the storage 30 is identified. And the file ("/test") is obtained from the storage 30. Then, the obtained file ("/test") is sent to the client process 100 (step 3002).

By executing the above processing, the client process 100 can obtain the requested WORM file.

Here, explanation is given regarding a case where there is a file that is associated with the file ("/test") which was obtained by the client process 100 and this associated file must be read.

The client process 100 sends a read request for the file ("/aa/a") which is associated with "/test" (step 3003). At this time, the client process 100 knows only the file name of the associated file, and does not know the archived date. Thus, the request sent by the client process 100 is sent using the file name interface 210.

The WORM archive server 20 receives the file read request and transfers the file read request to the archived date appending module 450. The archived date appending module 450 extracts the connection ID of the file read request. The WORM archive server 20, using the extracted connection ID, searches the archived date management table for connections 550, and obtains the archived date of the file corresponding to that connection ID. Then, the obtained archived date is appended to the file read request and transferred to the file identifying module 700. The file identifying module 700 executes file identifying processing to identify the file managed by the WORM archive server 20 based on the file (/aala) of the read request and the archived date thereof.

The WORM archive server 20 references the file information table 800 to obtain the storage path name, identifies the file location in the storage 30, and obtains from the storage 30 the file (/aa/a) identified by the file identifying processing. Then, the obtained file (/aa/a) is sent to the client process 100 (step 3004). It should be noted that the connection established at step 3001 is released upon the elapse of a given period or upon a request from the client process.

By executing the above series of processing, when the client process 100 makes the read request to read the WORM file, the file can be obtained by designating only the file name, even without designating information for identifying the file (such as the file ID and archived date).

It should be noted that as described above, since plural client processes 100 run on the client node 10, the client process 100 that saves the file and the client process 100 that reads the file are not necessarily the same.

Figure 10:
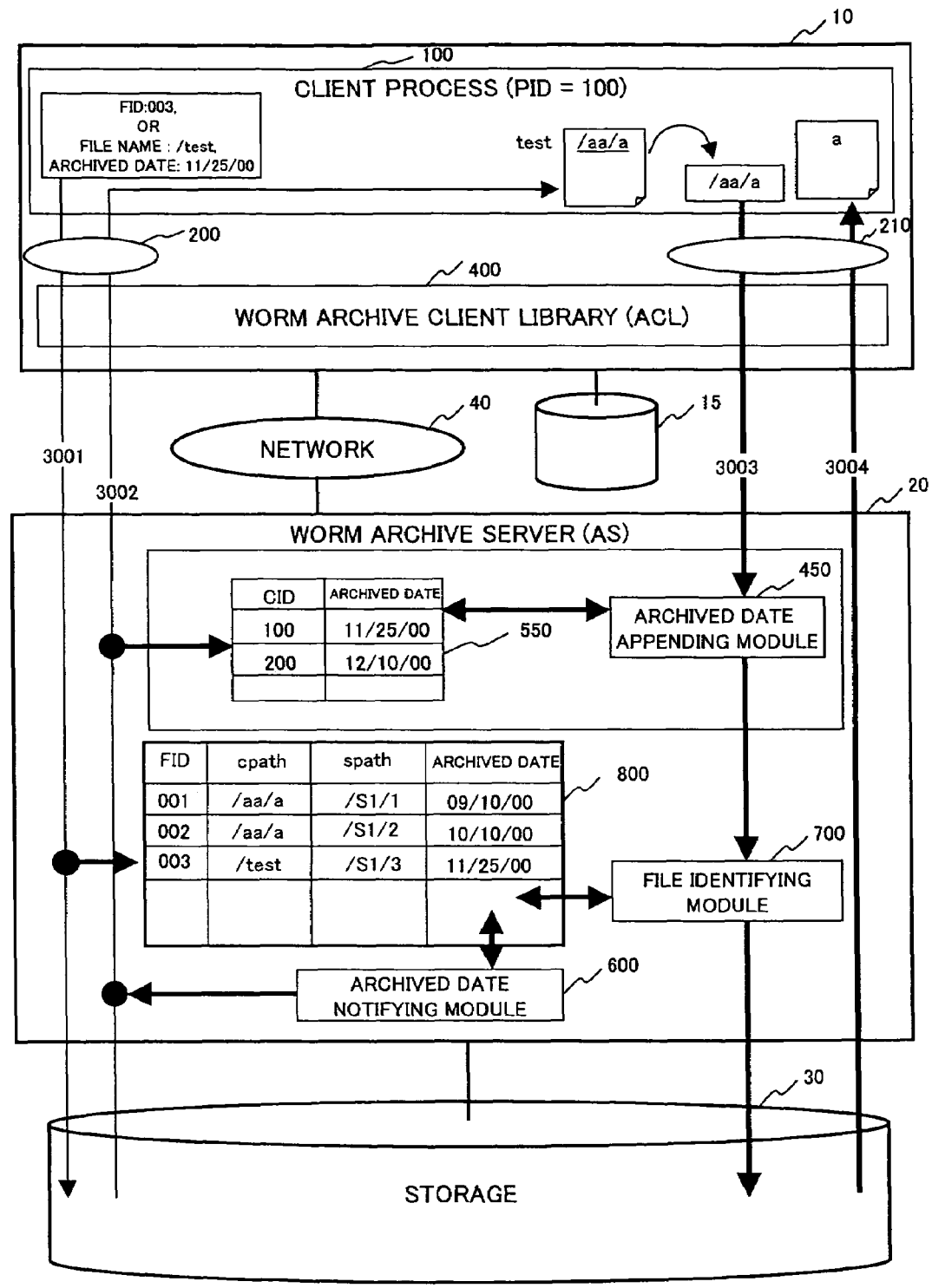
FIG. 10 is an explanatory diagram of processing in the storage system according to the second embodiment.

FIG. 10 is an explanatory diagram of the processing in FIG. 9 adapted to the system structure diagram in FIG. 7.

As described above, the premise is that the client process 100 registers the file ("/test") in the WORM archive server 20 beforehand.

When the client process 100 (process ID is "100") requests to read the WORM file ("/test"), either the file ID (003) of the WORM file is designated or both the file name (/test) and the archived date (Nov. 25, 2000) are designated, and the file ID/file name and archived date interface 200 is used to make the file read request to the WORM archive server 20 (step 3001). By sending this request, the connection from the client 10 to the WORM archive server 20 is established. This connection is given a unique identifier (connection ID).

The WORM archive server 20, when the file read request is received, first obtains the connection ID of the read request and the archived date of the WORM file for which the read request was made. Then the WORM archive server 20 associates these and saves them in the archived date management table for connections 550.

Next, the file information table 800 is referenced and the file (/test) is obtained from the storage 30. Then, the obtained file (/test) is sent to the client process 100 (step 3002).

When the client process 100 reads the file (/aa/a) that is associated with the file (/test) obtained, first the client process 100 sends the file read request designating only the file name (/aa/a) (step 3003). This request is sent using the file name interface 210.

The WORM archive server 20 receives the file read request and transfers the file read request to the archived date appending module 450. The archived date appending module 450 obtains the connection ID of the file read request, uses the obtained connection ID (100) to search the archived date management table for connections 550, and obtains the archived date of the file corresponding to that connection ID. Then, the obtained archived date is appended to the file read request and transferred to the file identifying module 700. The file identifying module 700 executes file identifying processing to identify the file managed by the WORM archive server 20 based on the file (/aa/a) of the read request and the archived date.

The WORM archive server 20, referring to the file information table 800, obtains the storage path name, and obtains from the storage 30 the file (that filename is /aa/a, archived on Oct. 10, 2002, having RD 002) Identified by the file identifying processing. Then, the obtained file (/aa/a) is sent to the client process 100 (step 3004) it should be noted that the connection established at step 3001 is released upon the elapse of a given period or upon a request from the client process.

In the storage system according to the second embodiment, when the client process 100 reads the WORM file, the WORM archive server 20 obtains the archived date of the WORM file and records the archived date into the archived date management table for connections 550. When the client process 100 reads the file that is associated with the WORM file, it sends the file read request designating only the file name to the WORM archive server 20. The archived date appending module 450 included in the WORM archive server 20 references the archived date management table for connections 550, and appends the archived date of the WORM file to the read request for the file associated with the WORM file, and then transfers these to the file identifying module. The file identifying module 700 identifies the file requested by the client process 100, based on the file name and the archived date contained in the received read request. Then, the identified file is read from the storage 30 and sent to the client process 100.

By executing the above processing, the client process 100 can read from the WORM archive server the file with the unknown archived date associated with the WORM file by designating only the file name. Further, as compared to the first embodiment, since the connection from the client node is managed on the WORM archive server 20 side instead of at the client node 10, there is an effect that the load on the client node 10 decreases.

Third Embodiment

A third embodiment is a modified example of the first or second embodiment. When requesting to read the file from the client node 10 side (the client process 100), a request combining the file name and information indicating the desired date is sent. The WORM archive server 20 receives the request and identifies the file, and sends the identified file to the client node 10 side. It should be noted that constructions functioning identically to the first or second embodiment have the same reference numerals, and explanations thereof are omitted.

Figure 11:
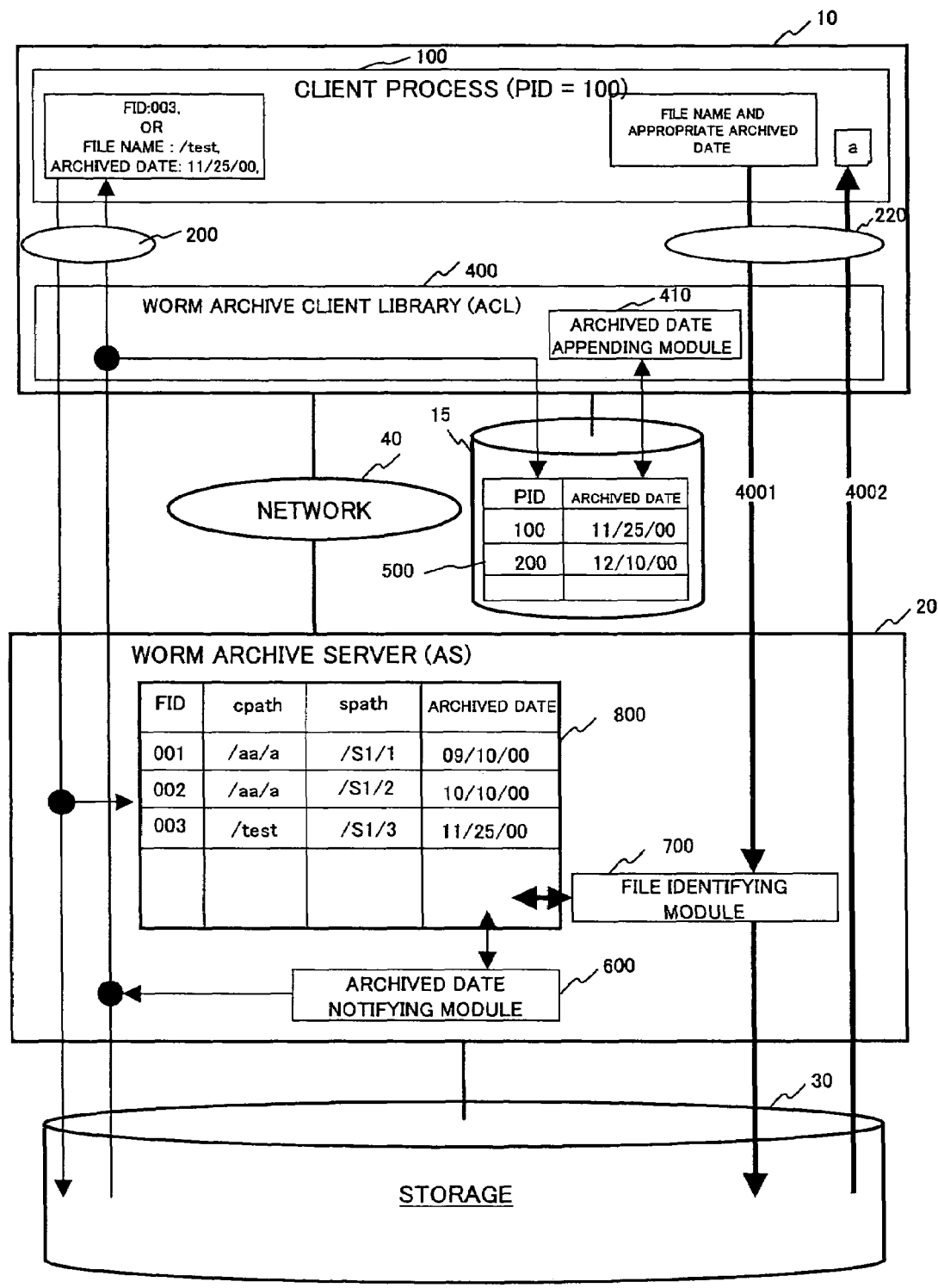
FIG. 11 is an explanatory diagram of processing in a storage system according to a third embodiment.

FIG. 11 is an explanatory diagram of processing in the storage system according to the third embodiment, adapted the constructional diagram of the first embodiment (FIG. 1).

As described above, the client process 100 sends to the WORM archive server 20, a file read request that indicates the file ID, or a set of the file name and the archived date, whereby the file is obtained. This processing is indicated by thin arrow lines in FIG. 10.

Here, explanation is given regarding a case where the client process 100 sends the file read request designating the file name and any desired date (indicated by thick arrow lines).

The case where "any desired date" is designated includes a case where, instead of first obtaining the original file and using the archived date of that file as a reference to obtain the file as was done in the first and second embodiments, a file that is requested in the read request and is most recently archived before the designated date is to be obtained.

First, the client process 100 designates the file name and any desired date. And the client process 100, using a file name and archived date interface 220, requests the WORM archive server 20 to read the file (step 4001).

The WORM archive server 20 receives the file read request and first transfers the file read request to the file identifying module 700.

The file identifying module 700 follows the processing sequence described above in FIG. 6, identifies the file, among the requested file names, with the archived date closest to the designated archived date. The WORM archive server 20 references the file information table 800 to obtain from the storage 30 the file indicated by the file identifying processing. Then, the obtained file is sent to the client process 100 (step 4002).

It should be noted that in FIG. 11, as in the first embodiment, explanation was given using as an example the storage system in which the client node 10 manages the archived dates of the files per process. However, as in the second embodiment, this can be applied even in the storage system where the WORM archive server 20 manages the archived dates per connection. In such a case, the file identifying module 700 of the WORM archive server 20 receives the file read request sent from the client process 100 and identifies the file. Then the file identifying module 700 sends the identified file to the client process 100.

In the storage system according to the third embodiment, the client process 100 designates any desired date for the WORM file which it wishes to read, whereby the latest archived WORM file after the designated date can be read. In particular, in the case where plural WORM files with the same path names are stored in the storage 30, the latest archived file with the given archived date desired by the client process 100 can be obtained.

Fourth Embodiment

A fourth embodiment is a modified example of the first to third embodiments, which is processing executed at step 2005 in the above-mentioned flowchart of FIG. 6 when the designated file does not exist.

When the WORM archive server execute file identifying processing for the file (/aa/a) of the read request from the client process 100, there are cases where that file does not exist in the WORM archive server 20.

That the "file does not exist in the WORM archive server 20" means that the file was deleted. File deletion can occur when executed due to a request from the user after expiration of a retention period set for the file, or when the system (the WORM archive server 20, etc.) automatically executes execution after the expiration of a file retention period, or the like.

In order to use a file retention period, it is necessary to add a retention period column to the file information table 8, and after the period determined in the retention period column ends, the file must be deleted manually by an administrator of the WORM archive server 20 or by a request from the client process 100, or the file must be automatically deleted by processing of the WORM archive server 20. It should be noted that it is not necessary to designate the retention period for the file. A file that is not designated with a retention period cannot be deleted permanently.

File deletion can be executed by two methods. One is a method in which the file entry is deleted from the file information table 8. Another is a method in which the file entry is left and an indication that the file was deleted is recorded in the file information table 800. In order to leave the indication of deletion in the file information table 800, a status column showing the status of the file (discernible status such as whether present or deleted) is added.

In the method of deleting the file entry from the file information table 8, when the requested file entry is deleted and it is determined that the requested file does not exist, at step 2006 in FIG. 6 mentioned above, a notification is sent to the client process 100, which was the source of the file read request, notifying the client process 100 of an error indicating that the file does not exist in the WORM archive server 20 (the storage 30 managed by the WORM archive server 20).

On the other hand, in the method of leaving the file while leaving the record indicating that the file was deleted in the file information table 8, when it is determined that the requested file has already been deleted, at step 2006 in FIG. 6 mentioned above, an error indicating that the file was deleted is notified to the client process 100 being the source of the read request.

It should be noted that in the status column of the file information table 8, it is also possible to include a deletion date, a name of a deleter who deleted the file, and the like.

Figure 12:
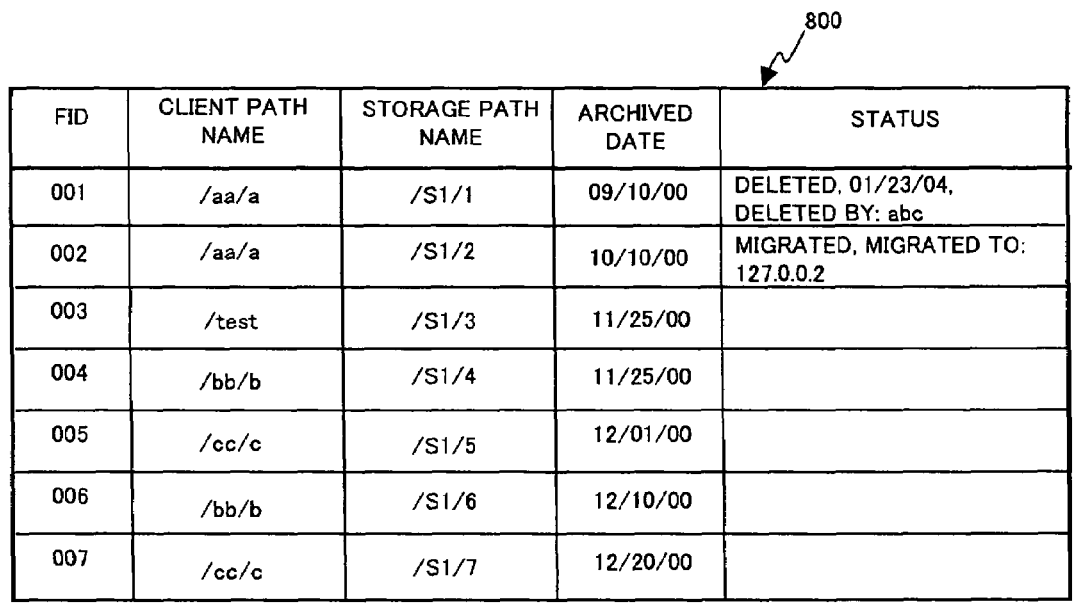
FIG. 12 is a table showing an example of a file archived date management table according to a fourth embodiment.

FIG. 12 is the file information table 800.

The status column is added to the file information table 800. In the status column, there is stored information including the file deletion, the deletion date and time, the name of the deleter, file migration, a migration destination.

The WORM archive server 20 obtains the content of the status column so as to be able to create the error message containing detailed information about the deleted file and notify the client process 100 of the error message. The client process 100 can reference the content of the received error message to handle various situations. For example, in a case where it is clear who deleted the file, it is also possible to request the file from the deleter (although the deleter does not necessarily have the file).

Further, there is the case where the file is not present in the storage 30 managed by the designated WORM archive server 20. The case includes that the above-mentioned retention period has elapsed and the file was deleted. And the case includes that the administrator migrates the file to a storage 30 managed by another WORM archive server 20, due to insufficient capacity of the storage 30 and the like. And the case includes that, since there is no plan to access the file for a long period of time, the administrator migrates the file to a storage 30 managed by another, inexpensive WORM archive server 20.

In this case as well, as described above, when the file migrates and the entry is deleted in the file information table 8, the error is returned indicating the file does not exist.

On the other hand, it is also possible to add a status indicating file migration to the status column in the file information table 8, so that the WORM archive server 20 can reference this status and notify the client process 100 that the file has migrated.

It is also possible to add a file migration destination column to the file information table 8, to store the address of the WORM archive server 20 to which the file was migrated. In this case, the WORM archive server 20 to which the client process 100 requested the file reading returns the file migration destination column to the client process 100, and the client process 100 can then request the migration destination WORM archive server 20 again to obtain the file. Cases where the file does not exist in the storage 30 managed by the WORM archive server 20 can be due to deletion or migration of the file, and also due to a mistake made by the client or the like, which would cause the designation of identifiers, file names, and the like of files which do not exist in the first place. In such a case, the WORM archive server 20 has only to notify the client process being the source of the file read request of an error indicating that the file identifier or the file name does not exist.

In the storage system according to the fourth embodiment, the information about the deletion of the file is recorded in the file information table 8, and the information about the deletion of the file (the file deletion date, migration destination, etc.) can be returned to the client process 100 that requested to read the deleted file. Therefore, the client process 100 can execute appropriate processing (such as making a file obtaining request to the deleter of the file and making a file read request to the file migration destination) based on the information about the deletion.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, comprising:

a client that issues a file write request or a file read request;

an archive server that is connected to the client via a network, and processes the request issued from the client;

a storage device that is connected to the archive server, and records files; and a disk drive connected to the client, wherein:

the client comprises at least one client process and an archive client library;

the client process sends a first file read request containing at least one of a first file identifier and a combination of a first file name and an archived date to the archive server;

the archive server:

when the archive server receives the first file read request sent from the client process, referring to a file information table stored beforehand in the archive server, identifies the first file, based on the at least one of the file identifier and the combination of the first file name and the archived date contained in the first file read request, obtains the identified first file from the storage device, and sends the obtained first file to the client process;

the archive client library:

extracts a file archived date from the first file sent from the archive server, obtains a process identifier of the client process that requested the first file;

stores in the disk drive a combination of the extracted archived date and the obtained process identifier, in an archived date management table for processes;

when the archive client library receives a second file read request containing a second file name of a second file relating to the first file obtained from the archive server, obtains an archived date stored in the archived date management table for processes, appends the obtained archived date to the second file read request, and sends the second file read request to the archive server; and the archive server:

when the archive server receives the second file read request sent from the client process, obtains the second file name and the archived date from the second file read request, identifies a latest archived file having the obtained second file name that was recorded before the obtained archived date, from among the files recorded in the storage device, referring the file information table recorded in the archive server, obtains the identified second file from the storage device, and sends the obtained second file to the client process.

2. A storage system, comprising:

a client that issues a file write request or a file read request;

an archive server that is connected to the client via a network, and processes the request issued from the client;

a storage device that is connected to the archive server, and records files; and a disk drive connected to the client, wherein:

the client comprises at least one client process and an archive client library;

the client process sends a first file read request containing at least one of a first file identifier and a combination of a first file name and an archived date to the archive server;

the archive server:

when the archive server receives the first file read request sent from the client process, referring to a file information table stored beforehand in the archive server, identifies the first file requested in the file read request, based on the at least one of the first file identifier and the combination of the first file name and the archived date contained in the first file read request, stores a combination of an archived date of the identified first file, and a connection identifier contained in the first file read request from the client process, in an archived date management table for processes, obtains the identified first file from the storage device, and sends the obtained first file to the client process;

the client process:

sends to the archive server a second file read request containing a second file name of a second file associated with the first file obtained from the archive server; and the archive server:

when the archive server receives the second file read request sent from the client process, obtains the second file name contained in the second file read request and the connection identifier of the first file read request;

obtains the archived date that corresponds to the obtained connection identifier that is stored in the archived date management table for processes, appends the obtained archived date to the received second file read request, identifies a latest archived file having the obtained second file name that file was recorded before the appended archived date, from among the files stored in the storage device, refers to the file information table stored in the archive server, obtains the identified second file from the storage device, and sends the obtained second file to the client process.

3. A storage system, comprising:

a client that issues a file write request or a file read request;

a file management device that is connected to the client and processes the request issued from the client; and a storage device that is connected to the file management device, and records files, wherein:

the client comprises a read request module that sends, to the file management device, a first file read request containing at least one of a first file identifier and a combination of a first file name and an archived date and that sends, to the file management device after a first response of the first file read request from the file management device, a second file request containing a second file name and information corresponding to an archived date of the first file;

a disk module that stored a combination of an archived date of a first file obtained before the process sent the second file read request and a process identifier, in an archived date management table for processes; and an archived date appending module that appends, to the second file read request, the archived date of the first file corresponding to the identifier of the process that sent the first file read request, and the file management device comprises:

a file identifying module that identifies the first file based on the at least one of the file identifier and the combination of the first file name and the archived date contained in the first file read request, when the first file read request is received, that obtains the identified first file from the storage device, that, when the second file read request is received, extracts the information corresponding to the first file archived date and the second file name from the second file read request received from the client, and identifies a latest archived file recorded before the archived date indicated in the extracted information from among the files recorded in the storage device; and a file sending module that sends the obtained first or second file to the client that sent the first or second request.

4. The storage system according to claim 3, wherein the second file is associated the first file.

5. The storage system according to claim 4, wherein a link in the first file is set to the second file.

6. The storage system according to claim 5, wherein the first file and the second file are configured to a WORM (Write Once Read Many) file.

7. The storage system according to claim 3, wherein the file identifying module obtains any files from the storage device having the same file name as the file name from the file read request, and compares archived dates thereof to the file archived date from the file read request to identify the latest archived file recorded before the archived date indicated in the extracted information from among the files recorded in the storage device.

* * * * *